(12) United States Patent
Philistine

(10) Patent No.: US 6,929,226 B1
(45) Date of Patent: Aug. 16, 2005

(54) TWIST LOCK MOUNTING SYSTEM

(75) Inventor: John J. Philistine, Rising Sun, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 10/638,736

(22) Filed: Aug. 11, 2003

(51) Int. Cl.[7] ............................................. F21V 35/00
(52) U.S. Cl. .......................... 248/222.52; 248/222.12; 248/224.61
(58) Field of Search ...................... 248/222.52, 222.51, 248/317, 323, 223.41, 223.51, 223.61, 222.12; 403/387, 329, 326, 348

(56) References Cited

U.S. PATENT DOCUMENTS

| | | | | |
|---|---|---|---|---|
| 362,767 | A * | 5/1887 | McNair ....................... | 403/350 |
| 1,810,229 | A * | 6/1931 | Stirrup ................... | 248/222.52 |
| 2,859,710 | A * | 11/1958 | Elsner ......................... | 248/502 |
| 2,931,471 | A * | 4/1960 | Howard, Jr. ................ | 403/22 |
| 3,461,637 | A * | 8/1969 | Jansson ..................... | 52/716.6 |
| 3,722,910 | A * | 3/1973 | Heckenlaible .............. | 410/107 |
| 4,222,508 | A * | 9/1980 | Bott ........................... | 224/324 |
| 4,342,139 | A * | 8/1982 | Tanaka ........................ | 24/292 |
| 4,436,269 | A * | 3/1984 | Dirksing et al. ............ | 248/214 |
| 4,787,767 | A * | 11/1988 | Wendt ......................... | 403/187 |
| 4,840,525 | A * | 6/1989 | Rebentisch .................. | 411/85 |
| 4,903,934 | A * | 2/1990 | Fremstad .................... | 248/551 |
| 5,199,836 | A * | 4/1993 | Gogarty ....................... | 411/84 |
| 5,628,598 | A * | 5/1997 | Hofle ........................... | 411/85 |
| 5,836,035 | A * | 11/1998 | McElfish et al. ............. | 15/160 |
| 6,511,028 | B1 * | 1/2003 | Gretz ..................... | 248/222.52 |

* cited by examiner

*Primary Examiner*—Korie Chan
(74) *Attorney, Agent, or Firm*—Ulysses John Biffoni

(57) ABSTRACT

A twist lock mount for quick mounting and positioning a device to a support includes a mount receiving member attachable to or integral with the support and a mounting member attachable to or integral with a device to be mounted. The receiving member provides a channel covered by flanges that further define a narrower channel or slot. The mounting member is configured to slide into the channel when it is in one rotational orientation and to lock securely into place when it is in another. A rotation in the opposite direction will unlock the device so that the mount can be slid out of the channel quickly and easily. The twist lock mount simply and effectively prevents movement in the longitudinal, transverse and axial directions and is well suited for use in harsh, high vibration environments.

39 Claims, 2 Drawing Sheets

TWIST LOCK MOUNTING SYSTEM

GOVERNMENT INTEREST

The invention described herein may be manufactured, licensed, and used by or for the U.S. Government.

TECHNICAL FIELD

The present invention relates generally to a mounting system and more specifically to a twist lock mounting system for rapid and secure attachment and detachment of a variety of devices to various surfaces.

BACKGROUND

The present invention was developed to address the problem of mounting and dismounting of the M48 Lightweight Motor Blower (LWMB) to the airframe of the AH-64A Apache helicopter. The LWMB is part of the M48 Chemical-Biological Aircraft Mask system and provides filtered, breathable air to aircraft personnel. The LWMB must be securely mounted to the aircraft during flight operations and must be quickly and easily removable when aircraft personnel depart the aircraft. The mounting mechanism for the LWMB must be easy to operate and also be capable of performing in harsh environments where extreme vibration and shock loading is expected.

SUMMARY

In general, in one aspect, a twist lock mount for mounting and positioning a device to a support includes a mount receiving member and a mounting member. The mount receiving member includes parallel guide rails having opposing inner guide surfaces that define a channel therebetween, a pair of flanges projecting transversely from the guide rails over the channel and having edges that define a narrowed channel opening, a means for locking a mounting member, and a positioning stop to provide longitudinal positioning for the mounting member in the channel. In accordance with another aspect, the mounting member includes a hub having a rim adapted to slidably engage the mount receiving member flanges, and a lip extending radially outwardly from the hub, the lip including opposing peripheral edges dimensioned to slidably engage the opposing inner guide surfaces of the mount receiving member when the mounting member is in a first rotational orientation and further including a complementary locking mechanism to engaging the locking mechanism when the mounting member is positioned against the positioning stop and rotated to a second rotational orientation.

In general, in another aspect, the locking mechanism includes one or more recesses in the walls of the channel and the complementary locking mechanism includes one or more protrusions from a peripheral edge of the lip of the mounting member. In accordance with another aspect the protrusions include springably mounted lugs positioned on the lip of the mounting member. In general, in another aspect, the recesses include pockets with one or more chamfered edges to mate with complimentarily chamfered edges of the lugs.

In another aspect, the springably mounted lug is formed integrally with the lip and is comprised of a flexible plastic material. In yet another aspect, the mounting member is manufactured of a flexible plastic material in a single shot injection molding process.

In another aspect, a twist lock mount for mounting a device to a support includes a mount receiving member having a T-slot channel with an open end and a means for locking a mounting member in the channel. In another aspect, the mounting member is adapted to slide into the open end of the T-slot channel when it is in a first rotational orientation and includes a means for locking, adapted to be engaged by the means for locking of the mount receiving member when the mounting member is rotated in the channel into a second rotational orientation.

DETAILED DESCRIPTION

In the following detailed description of the preferred embodiments, reference is made to the accompanying drawings that form a part hereof, and in which are shown by way of illustration specific embodiments in which the invention, as claimed, may be practiced. This invention may, however, be embodied in many different forms and should not be construed as limited to the embodiments set forth; rather, these embodiments are provided so that this disclosure will be thorough and complete, and will fully convey the scope of the invention to those skilled in the art. As will be appreciated by one of skill in the art, the present invention may be embodied in methods and devices.

Figure 1:
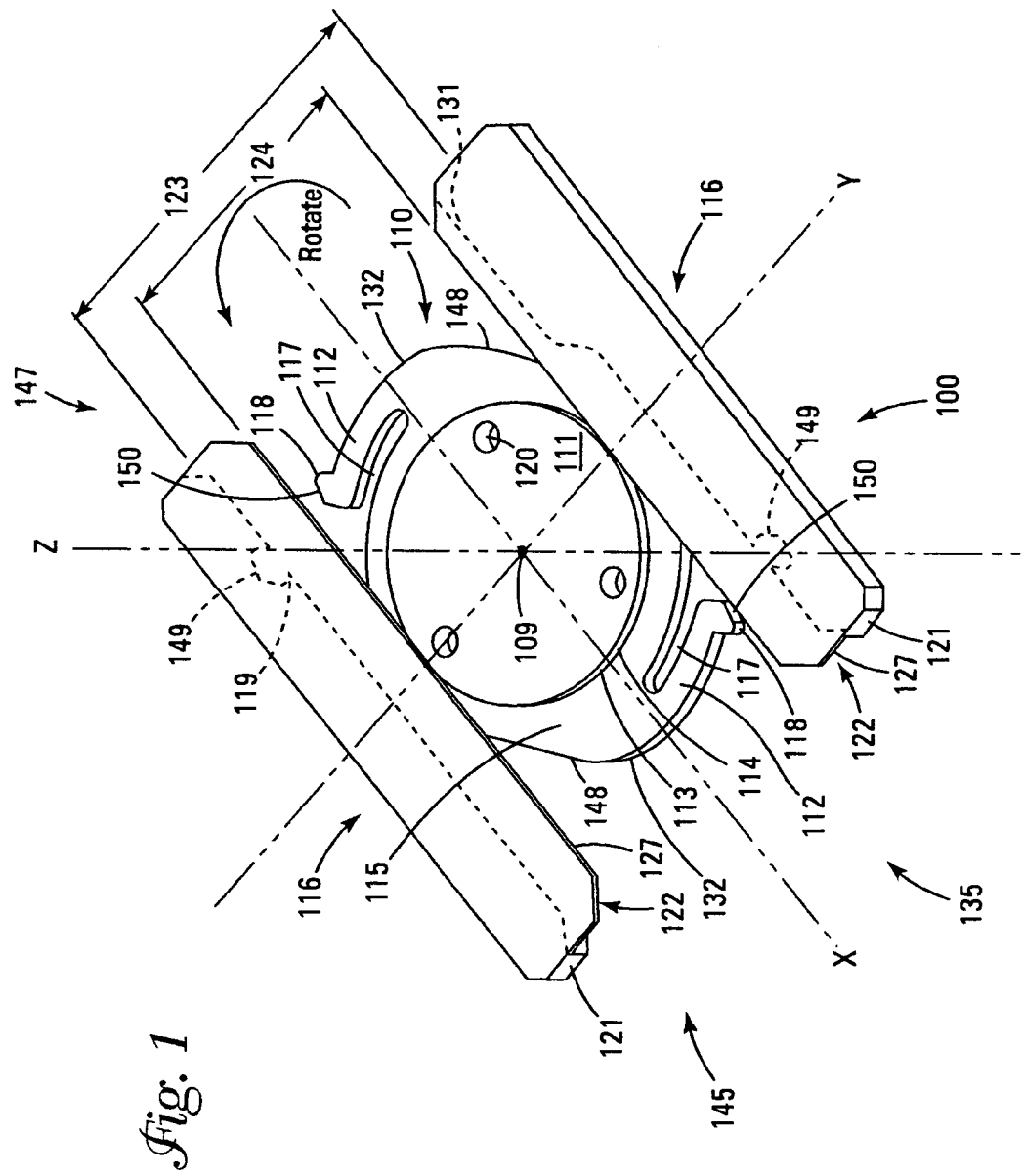
FIG. 1 is a perspective view from the top of one embodiment of a quick release mount.
Figure 2:
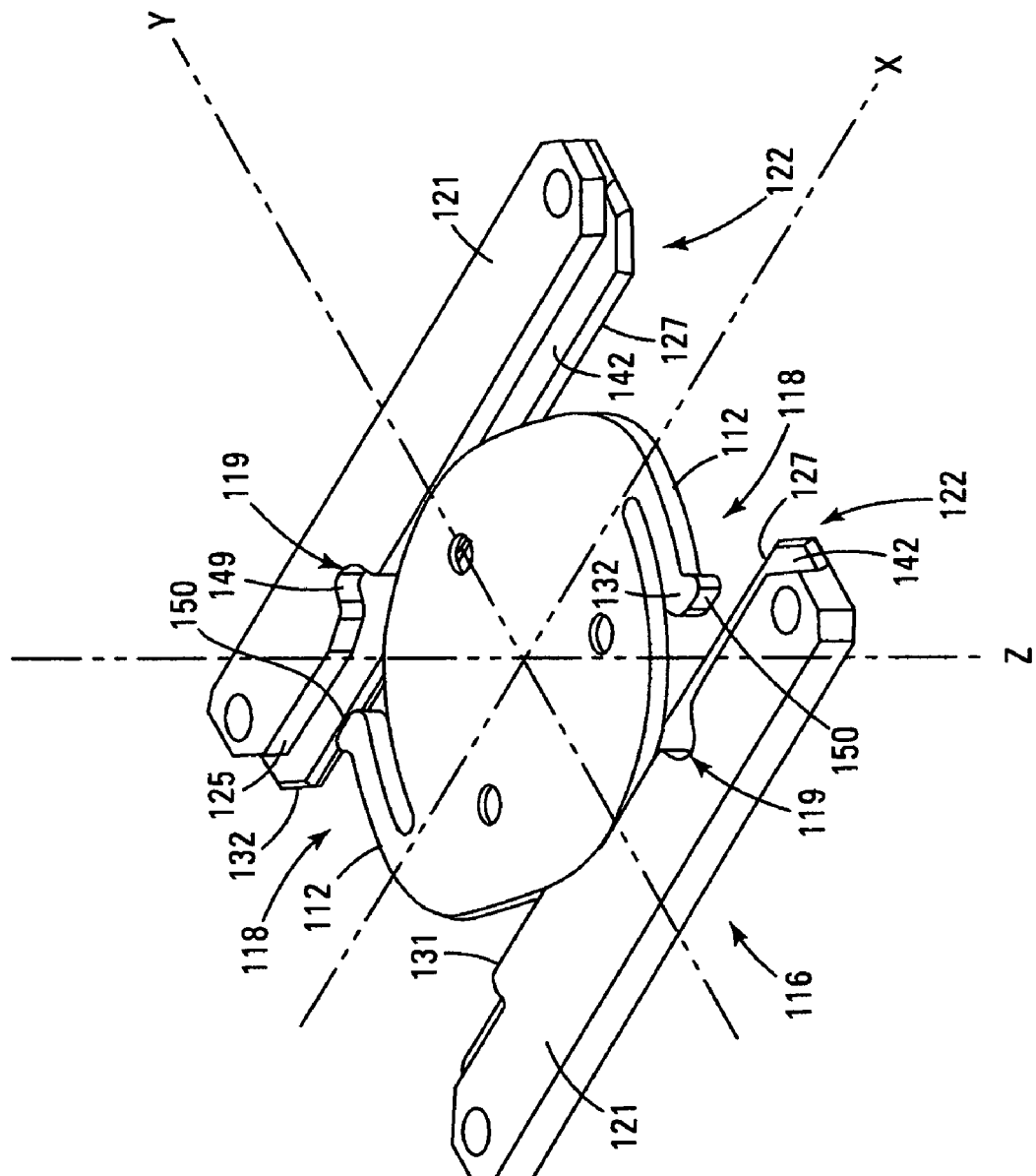
FIG. 2 is a perspective view from the bottom of one embodiment of a quick release mount.

FIGS. 1 and 2 show perspective views from the top and bottom, respectively, of an embodiment of a twist lock mount 100 according to the present invention. The twist lock mount 100 includes two basic components, a mounting member 110 that is secured to or integrated with a device to be mounted, and a receiving member 116 that is secured to or integrated with a mounting surface or support. Receiving member 116 provides a channel 123 for receiving and engaging mounting member 110. Mounting member 110 is configured to slide into the channel 123 when it is in one rotational orientation and to lock securely into place when it is in another. To mount a device with the twist lock mount 100, the user needs only to orient the mounting member so that it will slide into the channel and then to rotate the device in the channel until it locks securely in place. A rotation in the opposite direction will unlock the device so that the mount can be slid out of the channel quickly and easily.

As shown in FIGS. 1 and 2, receiving member 116 provides a channel 123 that is defined by a pair of opposing, parallel guide rails 121. Guide rails 121 extend longitudinally (in the x direction) and provide inner guide surfaces 125 that make up the walls of channel 123. Guide surfaces 125 extend axially (in the z direction) from the plane of the mounting surface or support (not shown) to the inner surfaces 142 of a pair of flanges 122 which project transversely over the channel 123 and prevent movement of the mounting member 110 in the axial direction (z). Flanges 122 terminate at parallel edges 127 which define a narrowed channel opening or slot 124. Thus channel 123 together with flanges 122 form a channel that is generally T-slot shaped.

Channel 123 has an open end 145 for receiving mounting member 110 and a stop end 147 which is blocked or partially blocked to prevent the passage of mounting member 110 and which provides for precise longitudinal positioning of mounting member 110 in the channel. In this example, a positioning stop 131 projects transversely into the channel 123 from one of the guide surfaces 125 proximate to the stop end 147 of the channel 123. As can be seen from FIGS. 1 and 2, embodiments of twist lock mount 100 can provide a very low profile to facilitate surface mounting of devices in confined spaces.

The present invention locks the mounting member 110 in the receiving member 116 after it has been slid into the channel 123. In general, a locking mechanism such as an elastic or spring biased protrusion seats into a recess or pocket when the mounting member 110 is rotated into a lock position. In the embodiment shown in FIGS. 1 and 2 receiving member 116 includes a pair of recesses 119 in guide surfaces 125. In general, recesses 119 are cut to match the shape of protrusions such as lugs, teeth, or keys, positioned about the circumference of mounting member 110. The protrusions are longitudinally staggered to be equidistant from the axis of rotation (z axis) of mounting member 110 when it is positioned against positioning stop 131. To facilitate locking and unlocking chamfered mating surfaces 149 of recesses 119 may be provided.

Mounting member 110 has two basic aspects, a low profile disc shaped hub 111 centered on an axis 109 (z axis), and an eccentric or oblong lip 115 extending radially outwardly from the hub 111. The circumference of hub 111 is bounded by a rim 113, which fits complimentarily into the narrowed channel opening 124 of receiving member 116 and slidably engages edges 127 of flanges 122 as the mounting member 110 is inserted into the channel 123. In this embodiment, hub 111 includes three mounting holes 120 for inserting screws, bolts or rivets to secure the device to be mounted. Other embodiments may use other attachment means such as an adhesive to secure the device to be mounted to mounting member 110.

The eccentric lip 115 of mounting member 110 is defined generally by a narrow axis and a wide axis. The narrow axis terminates at parallel peripheral edges 148 which slidably engage inner guide surfaces 125 of the receiving member 116 as the mounting member 110 is inserted into the channel 123. A locking mechanism is positioned on either or both ends of the wide axis of the lip 115. The locking mechanism includes a pair of protrusions 118 which are configured to complimentarily seat in recesses 119 of the receiving member 116 when the mounting member 110 is positioned against the positioning stop 131 and rotated to a lock position. In this embodiment, protrusions 118 include nubs or lugs 150 positioned at the ends of elastically flexible arms 112. Arms 112 curve circumferentially around the hub 111 and are offset from the lip 115 by gaps 117 to allow clearance for the arms 112 to flex inwardly as the protrusions 118 slidably engage the guide surfaces 125. In this embodiment arms 112 curve around the hub 111 in the direction of rotation (counterclockwise with respect to FIG. 1) so that protrusions 118 will seat in recesses 119 after approximately one-quarter turn. In other embodiments arms 112 may be positioned around the circumference of lip 115 to curve in a direction opposite to the direction of rotation. In addition, other rotational securing mechanisms may likewise be used in other embodiments of the present invention. For example, protrusions 118 may include one or more spring biased ball bearings or nubs, teeth, lugs, catches, and the like, positioned along the outer surfaces of lip 115 to positively engage recesses 119 when the mounting member is rotated in the channel 123 against the positioning stop 131. In still other embodiments, lip 115 may provide one or more recesses into which protrusions from guide surfaces 125 will seat after rotation of the mounting member to a lock position.

Operation of the twist lock mount 100 will now be described. To engage the twist lock mount 100, mounting member 110, which is attached to a device to be mounted, such as the LWMB, is inserted into the open end 145 of receiving member 116, shown on the left side of FIG. 1. The rotational position of mounting member 110 is aligned so that the narrow axis of lip 115 is in a direction transverse with respect to the channel 123, with the arms 112 in a forward and aft positions of the mounting member 110, so that opposing peripheral edges 148 can slide along guide surfaces 125 of the receiving member 112. The lip 115 thus acts as a retainer and a guide as the mounting member 110 is inserted between the guide rails 121 of receiving member 116. In this rotational orientation, mounting member 110 slides longitudinally into the channel 124 until it comes to rest against positioning stop 131. Mounting member 110 is then rotated in a counterclockwise direction (with respect to FIG. 1). As mounting member 100 is rotated, a user may observe a slight resistance as the protrusions 118 press against the inner guide surfaces 125 and the arms 112 flex radially inwardly. After approximately one-quarter turn, lugs 150 or other protrusions will be positioned over recesses 119, and the elastic arms 112 will urge the lugs 150 into recesses 119 so that they are seated securely. At this point the mounting member 110 is locked into position and will resist further rotation in the counterclockwise direction. Additionally, the locked mounting member 110 will resist movement in the lateral, axial and transverse directions. The twist lock mount 100 may provide a positive indication to the user that it has locked into position such as by providing an audible or tactile snap or click. In environments such as the high vibration environment of a helicopter, it may be desirable to provide an electrical or optical signal to indicate the locked or unlocked status of the twist lock mount 100.

A twisting force in the opposite direction (clockwise with respect to FIG. 1) and rotation of about a quarter turn is all that is needed to unseat lugs 150 from recesses 119 and free the mounting member 110 so that it can slide out of the open end 145 of channel 123. The amount of force to lock and unlock the mounting can be adjusted to suit the requirements of different applications. As will be appreciated, the twisting force required to operate twist lock mount 100 may be calibrated to provide for easy locking and unlocking in different operating environments while still ensuring that the mount will not spontaneously unlock. In some applications, it may be desirable to configure the twist lock mount 100 to lock permanently into position in one operation, such as by squaring the edges 149 of recesses 119 so that the lugs 150 will remain permanently seated.

Vibration can be a problem for sensitive equipment such as aircraft instruments and avionics. In another aspect of the present invention, twist lock mount 100 may advantageously provide vibration damping for devices to be mounted. For example, the mating surfaces of the twist lock mount 100 may be configured to dampen and dissipate vibrations at frequencies likely to be encountered in high vibration environments such as an aircraft, as would be readily understood to those of skill in the art.

It will be appreciated that embodiments of the present invention can be manufactured in a variety of ways, and from a wide variety of materials. In most embodiments the two principal components can be of an inexpensive, unitary, molded manufacture, utilizing a widely available plastic material such as nylon. Selection of the material for mounting member 110 will depend on the material's ability to flex within its elastic limits. In applications where mechanical stresses and shock loading are a factor it is preferred that both the mounting member 110 and the receiving member 116 be manufactured of a flexible, tough grade impact modified nylon. The parts may be manufactured in a single shot injection molding or extrusion process. Other plastic molding techniques, such as, for example, casting and compression molding which are familiar to persons skilled in the art may also be employed. Where metal is chosen as the material of construction for one or more components of a twist lock mount according to the invention, those skilled in that art will recognize die casting as a preferred method of fabrication. Regardless of the method of manufacture, it is viewed as greatly preferable to produce components such as the mounting member 110, as unitary pieces in the various embodiments of the present invention. However, the elements of this invention may also be separately manufactured and assembled into a complete device by adhesives or by mechanical means, which will be readily apparent to those knowledgeable in the art of the material of fabrication.

The present invention thus provides a low profile and lightweight mounting configuration that is simple to manufacture, install and operate. The present invention may be scaled to accommodate various device and equipment sizes, thus facilitating adaptability in a wide variety of commercial, consumer and military applications.

CONCLUSION

As has been shown, embodiments of twist lock mounting systems according to the present invention provide simple, ergonomic, easily securable, quickly releasable, low profile, mounting mechanisms for a variety of equipment, components and devices in a number of different working environments. For example, embodiments of the twist lock mounting system can advantageously be deployed in harsh environments where extreme vibration and shock loading is expected. The ease of operation, simplicity of manufacture and scalability of the present invention will enable embodiments to be used in many other applications, particularly where there is a need for a mounting system that provides rapid and secure manual attachment and detachment of devices and components in confined spaces. In addition, embodiments of twist lock mounting systems precisely define the position of the mounted part relative to the holding part, lock the part securely into place and unlock the same with a simple twist of the wrist. While the invention is simple to fabricate and to assemble at the same time it provides a high degree of stability, uniformity, and durability.

A number of embodiments of the invention defined by the following claims have been described. Nevertheless, it will be understood that various modifications to the described embodiments may be made without departing from the spirit and scope of the claimed invention. For example, while some embodiments described above provide recesses in guide surfaces of the receiving member and protrusions on the mounting member for engaging the pockets, in other embodiments protrusions may be positioned on the guide surfaces of the receiving member and recesses for receiving the protrusions may be provided in the mounting member. Additionally, in some embodiments, simple weight reduction modifications may be made such as the removal of material in the mount receiving members and hub of the mounting member. In other embodiments, electrical contacts may be integrated into the mounting. For example, an electrical, magnetic or optical contact, sensor, or switch may be integrated into the mounting to indicate when the device is in a locked or unlocked position.

Accordingly, other embodiments are within the scope of the invention, which is limited only by the following claims.

What is claimed is:

1. A twist-lock mount for mounting and positioning a device to a support, comprising:
   a receiving member comprising parallel guide rails having opposing inner guide surfaces that define a channel therebetween, a pair of flanges projecting transversely from said guide rails over said channel and having edges that define a narrowed channel opening, a means for locking a mounting member, and a positioning stop to provide longitudinal positioning for said mounting member in said channel; and
   wherein said mounting member comprises a hub having a rim adapted to slidably engage said edges of said receiving member flanges, a lip extending radially outwardly from said hub, said lip including opposing peripheral edges dimensioned to slidably engage said opposing inner guide surfaces of said receiving member when said hub is in a first rotational orientation, and further including a complementary locking mechanism to engage said locking means of said receiving member when said mounting member is positioned against said positioning stop and rotated to a second rotational orientation.

2. The twist-lock mount of claim 1, wherein said receiving member means for locking a mounting member comprises at least one recess in a wall of said parallel guide rails inner guide surfaces.

3. The twist-lock mount of claim 2, wherein said mounting member complementary locking mechanism comprises a protrusion from a peripheral edge of said lip to engage said recess.

4. The twist-lock mount of claim 2, wherein said recess includes a chamfered edge.

5. The twist-lock mount of claims 3, wherein said protrusion includes a chamfered edge.

6. The twist-lock mount of claim 3, wherein said protrusion is springably attached to said lip.

7. The twist-lock mount of claim 6, wherein said protrusion comprises a lug mounted on the end of an arm.

8. The twist-lock mount of claim 7, wherein a radial bias is placed on said arm as said mounting member is rotated from the first rotational orientation to the second rotational orientation.

9. The twist-lock mount of claim 7, wherein said mounting member is formed integrally of a flexible plastic material in an injection molding process.

10. The twist-lock mount of claim 1, wherein said mounting member is manufactured of a flexible plastic material in an injection molding process.

11. The twist-lock mount of claim 1, wherein said mounting member is adapted to be secured to a blower motor of a Chemical-Biological Aircraft Mask system and said receiving member is adapted to be secured to an aircraft.

12. The twist-lock mount of claim 7, wherein a rotation from the first rotational orientation in the direction of the second rotational orientation effects a bias on said arm that urges said lug into said recess when the second rotational orientation is reached.

13. The twist-lock mount of claim 1, further comprising an elastic arm formed integrally with the mounting member of a flexible plastic material.

14. The twist-lock mount of claim 1, further comprising said positioning stop comprising an inward projection from at least one of said parallel guide rails inner guide surfaces to engage said peripheral edges of said mounting member lip.

15. A twist-lock mount, comprising:
(a) a receiving member adapted to be secured to a mounting surface, the receiving member comprising:
  (i) a channel comprising a first pair of opposing longitudinal guide surfaces defining a first channel width and a second pair of opposing longitudinal guide surfaces positioned above the first pair of opposing longitudinal guide surfaces and defining a second channel width that is narrower than the first;
  (ii) a recess in at least one of said first pair of longitudinal guide surfaces; and
  (iii) a positioning stop comprising an inward projection from at least one of said first pair of opposing longitudinal guide surfaces; and
(b) a mounting member to be engaged by said receiving member and adapted to be secured to a device to be mounted, said mounting member comprising:
  (i) a hub comprising a rim adapted to slidably engage said second pair of opposing longitudinal guide surfaces;
  (ii) a lip extending radially from said hub, said lip including peripheral edges adapted to slidably engage said first pair of longitudinal guide surfaces in a first rotational orientation of said hub; and
  (iii) a locking mechanism adapted to be lockingly engaged in said recess of said receiving member when said hub is rotated into a second rotational orientation while positioned against said positioning stop.

16. The twist-lock mount of claim 15, wherein said locking mechanism comprises at least one lug at the end of an arm springably mounted to said lip and said recess comprises at least one lug pocket for receiving said lug.

17. The twist-lock mount of claim 16, wherein a spring or bias force is stored in said arm when said hub is rotated from the first rotational orientation in the direction of the second rotational orientation thus securing said lug in said recess.

18. The twist-lock mount of claim 17, wherein said stored spring or bias force is at least partially released when said hub is positioned in the second rotational orientation.

19. The twist-lock mount of claim 15, wherein said locking mechanism comprises a pair of springably mounted arms extending circumferentially around said lip and wherein a force is stored in said springably mounted arms when said hub is rotated from the first rotational orientation in the direction of the second rotational orientation.

20. The twist-lock mount of claim 15, wherein said mounting member is manufactured as a unitary component of a flexible plastic material.

21. The twist-lock mount of claim 15, wherein said mounting member is adapted to be secured to a light weight blower motor of a Chemical-Biological Aircraft Mask system and said receiving member is adapted to be secured to an aircraft.

22. The twist-lock mount of claim 15, wherein one or more components of said mount are adapted to provide vibration damping for devices to be mounted.

23. A twist-lock mount, comprising:
(a) a receiving member adapted to be secured to a mounting surface, said receiving member comprising:
  (i) an elongate channel comprising a first pair of opposing guide surfaces defining a first channel width and a second pair of opposing guide surfaces defining a second channel width narrower than the first;
  (ii) a recess in at least one of said first pair of opposing guide surfaces adapted to lockingly receiving a locking mechanism; and
  (iii) a positioning stop comprising an inward projection from at least one of said first pair of opposing guide surfaces; and
(b) a mounting member for securing to a device to be mounted, adapted to be engaged by said receiving member, said mounting member, comprising:
  (i) a hub comprising a rim adapted to slidably engage said second pair of opposing guide surfaces;
  (ii) an oblong lip extending radially outwardly from said hub, said lip comprising perimeter edges adapted to slidably engage said first pair of opposing guide surfaces in a first rotational orientation of said hub; and
  (iii) at least one locking mechanism adapted to lockingly engage in said recess in a second rotational orientation of said hub.

24. The twist-lock mount of claim 23, wherein said at least one locking mechanism comprises a springably mounted lug.

25. The twist-lock mount of claim 24, wherein said springably mounted lug is positioned at an end of an arm.

26. The twist-lock mount of claim 25, wherein said arm extends in a circumferential direction around said lip.

27. The twist-lock mount of claim 23, further comprising means to indicate when the mount is locked into position.

28. The twist-lock mount of claim 23, further comprising one or more electrical contacts.

29. The twist-lock mount of claim 28, wherein said electrical contacts are adapted to indicate when said twist lock mount is locked into position.

30. A mounting device, comprising:
a mount receiving member having a pair of parallel opposing guide rails defining an elongated opening and a pair of flanges projecting inwardly over the elongated opening and defining a pair of opposing flange edges, a pair of opposing recesses positioned in the guide rails; and
a mounting member having a hub that provides a first rim surface for engaging the opposing flange edges and a lip that extends radially outwardly from the hub providing opposing surfaces for engaging the guide rails in a first rotational orientation of the hub and providing a pair of springably mounted lugs extending outwardly from the lip and positioned to engage the recess in the guide rails when the hub is in a second rotational orientation.

31. The mounting device of claim 30, wherein the springably mounted lugs are positioned at the ends of opposingly mounting arms that curve circumferentially around the hub.

32. The mounting device of claim 31, wherein the opposing recesses are longitudinally staggered.

33. A twist-lock mount system, comprising:
means for receiving a mounting means, the receiving means adapted to be secured to a mounting surface and comprising:
first guide surface means defining a first channel opening and for slidably engaging the mounting means;
second guide surface means defining a second channel opening that is narrower than the first for slidably engaging the mounting means;

a recess in at least one of the guide surface means for lockingly engaging the mounting means; and mounting means to be engaged by the receiving means and adapted to be secured to a device to be mounted, the mounting means comprising:

hub means adapted to slidably engage the second guide surface means;

lip means extending outwardly from the hub means and comprising opposing guide surfaces and a locking means oriented approximately 90 degrees rotationally about the hub means from the opposing guide surfaces, the lip means adapted to slidably engage the first guide surface means in a first rotational orientation of the hub, and adapted to lockingly engage the locking means into the recess in a second rotational orientation of the hub.

34. The twist-lock mount system of claim 33, further comprising a position stop means for determining the longitudinal orientation of the mounting means in the channel.

35. The twist-lock mount system of claim 33, wherein the locking means comprises a spring.

36. The twist-lock mount system of claim 33, wherein the locking means comprises a lug mounted at the end of an arm.

37. A method of securing a device, comprising:

providing an elongated channel having a open end and a stop end for receiving and securing a mounting member, the elongated channel comprising a pair of first opposing guide surfaces defining longitudinal channel walls, a pair of second opposing guide surfaces defining a narrowed channel opening, a recess in at least one of the guide surface for lockingly engaging a locking means on the mounting member, and a positioning stop for longitudinally positioning the mounting member in the channel;

providing a mounting member having a hub adapted to slidably engage the second opposing guide surfaces and an lip extending outwardly from the hub, the lip adapted to slidably engage the first guide surfaces in a first rotational orientation of the hub and to lockingly engage the recess in at least one of the guide surfaces in a second rotational orientation of the hub;

positioning the mount so that the hub is in the first rotational orientation;

sliding the mount longitudinally into the open end of the channel until it rests against the positioning stop; and rotating the mount into the second rotational orientation of the hub to lock the mount into the channel.

38. A twist-lock mount for mounting and dismounting of a light weight blower motor of a Chemical-Biological Aircraft Mask system to an aircraft, comprising a mounting member and a mount receiving member, the mount receiving member comprising:

parallel opposing guide rails defining an elongated channel, a pair of flanges projecting inwardly over the elongated channel, a pair of chamfered lug pockets recessed in the guide rails and adapted to engage complementary lugs on the mounting member, and a positioning stop to longitudinally position the mounting member in the channel; and, the mounting member comprising:

a hub having a rim adapted to slidably engage the flanges, and an oblong lip extending outwardly from the hub, the lip including opposing peripheral edges for slidably engaging the guide rails when the hub is in a first rotational orientation and a pair of lugs mounted on the free ends of elastic arms extending circumferentially from the lip, the lugs adapted to complimentarily seat in the lug pockets when the hub is in a second rotational orientation and positioned against the positioning stop.

39. The twist-lock mount of claim 38, wherein the mounting member is comprised of a flexible plastic material of unitary construction and manufactured in a single shot injection molding process.

* * * * *